(12) United States Patent
Lee et al.

(10) Patent No.: US 8,808,843 B2
(45) Date of Patent: Aug. 19, 2014

(54) TRANSPARENT MULTILAYER SHEET HAVING ELECTROSTATIC DISSIPATIVE PROPERTIES

(75) Inventors: Hwa Yong Lee, Gyeonggi-do (KR); Tae Woong Lee, Gyeonggi-do (KR); Dong Sik Kim, Seoul (KR); Nam Jung Kim, Gyeonggi-do (KR); Young Woo Kim, Incheon (KR)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 649 days.

(21) Appl. No.: 12/810,323

(22) PCT Filed: Dec. 22, 2008
(Under 37 CFR 1.47)

(86) PCT No.: PCT/US2008/087900
§ 371 (c)(1),
(2), (4) Date: Jan. 4, 2011

(87) PCT Pub. No.: WO2009/086246
PCT Pub. Date: Jul. 9, 2009

(65) Prior Publication Data
US 2012/0021198 A1    Jan. 26, 2012

(30) Foreign Application Priority Data
Dec. 26, 2007 (KR) .................. 10-2007-0137676

(51) Int. Cl.
*B32B 7/02* (2006.01)

(52) U.S. Cl.
USPC ...... 428/212; 428/215; 428/423.1; 428/474.4

(58) Field of Classification Search
USPC ............................. 428/212, 215, 423.1, 474.4
See application file for complete search history.

(56) References Cited

U.S. PATENT DOCUMENTS

2003/0003302 A1 * 1/2003 Fahey et al. ................ 428/411.1

FOREIGN PATENT DOCUMENTS

JP    2007-320093 A    12/2007
WO    02/092341 A1    11/2002

* cited by examiner

*Primary Examiner* — Aaron Austin
*Assistant Examiner* — Lawrence Ferguson
(74) *Attorney, Agent, or Firm* — Christopher D. Hilker

(57) ABSTRACT

Disclosed is a transparent multilayer sheet that is excellent in antistatic properties, as well as transparency. The transparent multilayer sheet includes a surface layer comprising a conductive thermoplastic polyurethane or polyurea resin containing ethylene oxide; and a back layer attached to the surface layer and comprising a transparent non-conductive polymer resin. Preferably, the polyurethane or polyurea resin is a polymerization product of (a) a polyether-based polymer containing ethylene oxide and reacting with an isocyanate group; (b) an aromatic or aliphatic diisocyanate compound; and (c) a chain extender C2 to C10 containing a primary hydroxyl group or an amine group, and the transparent non-conductive polymer resin is selected from the group consisting of polyethylene terephthalate, glycol modified polyethylene tereph-thalate, glycol modified polycyclohexaneterephthalate, polymethylmethacrylate, polycarbonate, transparent acrylonitrile-butadiene-styrene (ABS), and mixtures thereof.

12 Claims, No Drawings

TRANSPARENT MULTILAYER SHEET HAVING ELECTROSTATIC DISSIPATIVE PROPERTIES

CROSS REFERENCE TO RELATED APPLICATION

This application claims priority from PCT Application Serial No. PCT/US2008/87900 filed on Dec. 22, 2008, which claims the benefit of Korean Patent Application No. 10-2007-0137676 filed on Dec. 26, 2007.

DETAIL DESCRIPTION

1. Technical Field

The present invention relates to a transparent multilayer sheet, and more particularly to a transparent multilayer sheet that is excellent in anti-static properties, as well as transparency.

1. Background Art

Static charge is generated and accumulated on most plastic surfaces. Since plastic materials have a low conductivity, they have a strong tendency to accumulate static charge thereon, which causes various problems with processing and use of plastics. For example, when a film is made of a plastic material having a low conductivity, not only static charge leads to strong adhesion between, the resultant films and thus makes it difficult to perform next processes, but also the merchantability of the film is lowered due to dusts, etc. clinging thereto. In particular, since many parts used in the electric/electronic industry may be damaged by even a very small, amount of static charge, the most important thing in the process of storing, transporting, and assembling such parts is to adjust the generation and dissipation of static charge.

A variety of electrostatic dissipative materials have been developed to suppress the generation and accumulation of static charge. For example, a method of obtaining electrostatic dissipative properties by adding an anti-static agent in the form of a low-molecular weight cation or anion to various polymer materials has been used for a long time. However, a low-molecular weight anti-static agent has a problem in that it is damaged under high-temperature conditions for polymer resin processing due to its low thermal resistance, and consequently electrostatic dissipative properties deteriorate. Also, when a low-molecular weight anti-static agent has poor compatibility with a polymer resin, there is a problem in that electrostatic dissipative properties deteriorate as time goes by because the low-molecular weight anti-static agent is eluted onto the surface. As another way to suppress the generation and accumulation of static charge, a method has been developed, in which an inherent conductive polymer (ICP) is dissolved together with a binder material in a solvent, and then a plastic surface is coated with the resultant solution. However, this method has a problem in that not only conductivity is readily lost because an ICP coated on a plastic surface easily peels off therefrom, but also the ICP has a very thin thickness of about several tens micrometers, and thus the coating surface is ruptured during thermoforming, etc. to generate a hot spot in which static charge is accumulated. As yet another way to suppress the generation and accumulation of static charge, there is a method of mixing an organic or inorganic filler, such as a metal or carbon black, with a polymer resin to prepare a polymer composite resin composition, but this method also has a problem in that an excess of filler (more than 10% by weight based on the total weight of a polymer resin) must be used to obtain sufficient electrostatic dissipative properties, which leads to deterioration of the mechanical properties of a polymer composite resin composition, such as impact strength. In particular, when a polymer composite resin composition containing carbon black is used for a packing container and the like, the carbon black is eluted to contaminate the surface of a product in the packing container.

To solve the above problems, a method of blending an inherently dissipative polymer (IDP) with another resin has also been developed, but this method has a drawback in that the transparency of the composite resin deteriorates due to a difference in refractive index between an IDP and another resin, and thus the method is difficult to apply to uses requiring transparency.

DISCLOSURE OF THE INVENTION

Technical Problem

Accordingly, an object of the present invention is to provide a transparent multilayer sheet that is excellent in anti-static properties, as well as transparency.

A further object of the present invention is to provide a transparent multilayer sheet, in which there is little fear of elution of an anti-static agent because a low-molecular weight, anti-static agent is not used, and there is little fear of peel-off between a conductive polymer layer and a non-conductive polymer layer because compatibility therebetween is excellent.

Technical Solution

In order to accomplish these objects, in accordance with an aspect of the present invention, there is provided a transparent multilayer sheet having electrostatic dissipative properties, the sheet including a surface layer comprising a conductive thermoplastic polyurethane or polyurea resin containing ethylene oxide; and a back layer attached to the surface layer and comprising a transparent non-conductive polymer resin.

Preferably, the polyurethane or polyurea resin comprises a polymerization product of (a) a polyether-based polymer containing ethylene oxide and reacting with an isocyanate group; (b) an aromatic or aliphatic diisocyanate compound; and (c) a chain extender C2 to C10 containing a primary hydroxyl group or an amine group, and the transparent non-conductive polymer resin is selected from the group consisting of polyethylene terephthalate, glycol modified polyethylene terephthalate, glycol modified polycyclohexaneterephthalate, polymethylmethacrylate, polycarbonate, transparent acrylonitrile-butadiene-styrene (ABS), and mixtures thereof. Also, it is preferred that the surface layer has a thickness of 0.05 to 3 mm, and the back layer has a thickness of 0.05 to 10 mm. Preferably, the transparent multilayer sheet is in the form of the back layer with the surface layer attached to either side thereof respectively.

Advantageous Effects

The transparent multilayer sheet according to the present invention has not only superior transparency, but also permanent and prominent electrostatic dissipative properties. Also, the transparent multilayer sheet of the present invention has good compatibility between a conductive polymer layer and a non-conductive polymer layer, resulting in reduced peer-off therebetween.

MODE FOR INVENTION

Reference will now be made in detail to the present invention.

The transparent multilayer sheet having electrostatic dissipative properties according to the present invention includes a surface layer that comprises a thermoplastic polyurethane or polyurea resin containing ethylene oxide, is transparent, and has electrostatic dissipative properties; and a back layer that is attached to the surface layer, and comprises a transparent polymer resin having no electrostatic dissipative property.

The polyurethane or polyurea constituting the surface layer of the transparent multilayer sheet according to the present invention is a resin having semi-permanent electrostatic dissipative properties, that is, an inherently dissipative polymer (IDP) resin, and comprises a polymerization product of (a) a polyether-based polymer containing ethylene oxide and reacting with an isocyanate group; (b) an aromatic or aliphatic diisocyanate compound; and (c) a chain extender C2 to C10 containing a primary hydroxyl group or an amine group. The polyether-based polymer mentioned above in (a) has a backbone containing an ethylene oxide group, and both end groups comprising alcohol (—OH) or amine (—NH$_2$) capable of reacting with diisocyanate. A linear polymer in the form of a homopolymer, the backbone of which comprises only ethylene oxide, a linear polymer in the form of a copolymer, the backbone of which comprises an ethylene oxide monomer and other kinds of monomers, or mixtures thereof may be used as the polyether-based polymer. The other kinds of monomers copolymerizable with ethylene oxide includes 1,2-propylene oxide, 1,3-propylene oxide, epichlorohydrin, 1,2-butylene oxide, 1,3-butylene oxide, styrene oxide, allyl glycidyl, n-butyl glycidyl ether, glycidyl acrylate, glycidyl methacrylate, 2-ethylhexyl glycidyl ether, mixtures thereof, and the like. The polyether-based polymer has a number average molecular weight (Mn) of about 500 to 10,000, preferably about 600 to 4,000, and more preferably about 1,000 to 2,000. When the polyether-based polymer has a number average molecular weight of less than 500, the electrostatic dissipative properties of a polymerized resin deteriorates. Contrarily, when the polyether-based polymer has a number average molecular weight of more than 10,000, there may be difficulties in polyurethane polymerization. Also, when an ethylene oxide monomer and other kinds of monomers form a copolymer, it is desirable that the ethylene oxide monomer is contained in an amount of 10% by mol or more for example, 10 to 80% by mol, preferably 30% by mol or more, and more preferably 50% by mol or more, based on a total of the monomers. If the content of the ethylene oxide monomer is too small, then there is a fear that the conductivity of the polymer resin deteriorates. Contrarily, if the content of the ethylene oxide monomer is too large, then there is a fear that the effect of addition of other kinds of monomers on physical properties may not be sufficiently obtained. Since the ethylene oxide polar group of the polyether-based polymer can form a hydrophilic polymer, the polyether-based polymer has semi-permanent and superior electrical conductivity.

Specific examples of the aromatic or aliphatic diisocyanate compound mentioned above in (b) include aromatic isocyanates, such as 1,6-hexamethylene diisocyanate (HDI), 4,4-dicyclohexylmethane diisocyanate (H$_{12}$MDI), 3-isocyanato methyl-3,5,5-trimethyl cyclohexyl isocyanate (IPDI), 1,4-cyclohexyl diisocyanate (CHDI), and 2,2,4-trimethylhexamethylene diisocyanate (TMDI); and aliphatic isocyanates, such as 1,4-phenylene diisocyanate, 2,4-toluene diisocyanate, 2,6-toluene diisocyanate, and mixtures thereof; 2,2'-methylene diphenyl diisocynate, 2,4'-methylene diphenyl diisocynate, 4,4'-methylene diphenyl diisocynate, and mixtures thereof; and naphthalene diisocynate, all of which may be used solely or in combination with others. It is preferred to use 4,4'-methylene diphenyl diisocynate or 1,6-hexamethylene diisocyanate (HDI) as the diisocyanate compound.

The chain extender mentioned above in (c), a material for extending the main chain of the polymer resin, is a compound that has 2 to 10 carbon atoms and contains a primary hydroxyl group or an amine group at both end groups thereof. Examples of the chain extender include diols, such as ethylene glycol, diethylene glycol, propylene glycol dipropylene glycol, 1,3-propanediol, 1,4-butanediol, 1,5-pentanediol, 1,10-decanediol, 2,2-dimethyl-1,3-propanediol, 1,4-cyclohexane dimethanol, hydroquinone bis(2-hydroxyethyl)ether, 1,6-hexanediol, and neopenthyl glycol; and diamine, such as 1,2-propylenediamine, 1,3-propylenediamine, isophoronediamine, ethylenediamine, N-methylpropylene-1,3-diamine, and N,N'-dimethylenediamine, all of which may be used solely or in combination with others. It is preferred to use 1,4-butanediol as the chain extender. The chain extender is used in an amount of 0.1 mol to 30 mol, preferably 0.1 mol to 10 mol, and more preferably 0.1 mol to 5 mol, based on 1 mol of the polyether-based polymer. Also, the diisocyanate compound is contained in an amount of 0.90 mol to 1.10 mol, preferably 0.92 mol to 1.05 mol, and more preferably 0.90 mol to 1.02 mol, based on 1.0 mol of a total of the chain extender and the polyether-based polymer (i.e., chain extender+polyether-based polymer). With regard to this, if the contents of the chain extender and the diisocyanate are out of the above ranges, then there is a fear that the properties of the prepared polymer deteriorate, or the polymerization of the polymer is not properly achieved.

The inherently dissipative polymer (IDP) resin may be prepared by a typical polyurethane or polyurea polymerization method. For example, it may be prepared by a one-shot polymerization method in which the polyether-based polymer containing ethylene oxide, the diisocyanate compound, and the chain extender are simultaneously reacted with each other, or may be prepared by blending the polyether-based polymer with the chain extender and then reacting the mixture with the diisocyanate compound. If necessary, it is possible to prepare the IDP resin, that is, polyurethane or polyurea, by reacting the polyether-based polymer with the diisocyanate to obtain a prepolymer and then reacting the obtained prepolymer with the chain extender.

Also, in order to enhance the electrostatic dissipative properties (conductivity) of the polymer resin, the IDP resin may further include an electrostatic dissipative property enhancer in the form of an inorganic or organic salt in an amount of 0.1 to 20 parts by weight, based on 100 parts by weight of a total of the polyether-based polymer, the diisocyanate compound, and the chain extender. The electrostatic dissipative property enhancer may be dispersed in the backbone of the polymer resin by being added during the polymerization of the polymer resin or being physically mixed with the polymerized polymer resin. With regard to this, if the electrostatic dissipative property enhancer in the form of an inorganic or organic salt is used in an amount of less than 0.1 part by weight, based on 100 parts by weight of a total use amount of the polyether-based polymer, the diisocyanate compound, and the chain extender, then the effect of enhancing electrostatic dissipative properties or conductivity is insignificant. Contrarily, if the electrostatic dissipative property enhancer is used in an amount of more than 20 parts by weight, then not only an increase in the effect of enhancing electrostatic dissipative properties or conductivity is insignificant, but also the product cost increases and the mechanical properties of the resin may decrease as the electrostatic dissipative property enhancer is used in excess.

Examples of the electrostatic dissipative property enhancer in the form of an inorganic salt include lithium perchlorate ($LiClO_4$), lithium hexafluorophosphate ($LiPF_6$), lithium hexafluoroarsenate ($LiAsF_6$), lithium iodine (LiI), lithium bromide (LiBr), lithium thiocyanate (LiSCN), lithium nitrate ($LiNO_3$), lithium sulfide ($Li_2S$), lithium tris(trifluoromethylsulfonyl)methide ($LiC(SO_2CF_3)_3$), trifluoromethanesulfonic acid lithium salt ($LiSO_3CF_3$), lithium(bis)trifluoromethane sulfonimide ($LiN(SO_2CF_3)_2$), lithium(bis)perfluoroethane sulfonamide ($LiN(SO_2C_2F_5)_2$), 5-lithiosulfo isophthalic acid, 3,5-diiodo-2-hydroxybenzoic acid lithium salt, 3,5-diiodosalicyclic acid lithium salt, beta-hydroxypyruvic acid lithium salt hydrate, carbamoylphosphate dilithium salt, p-toluenesulfinic acid lithium salt, poly(ethylene-co-methacrylic acid) lithium salt, toluene-4-sulfinic acid lithium salt anhydrous, and so forth, all of which may be used solely or in combination with others. It is preferable to use lithium(bis) trifluoromethane sulfonamide ($LiN(SO_2CF_3)_2$) or lithium (bis)perfluoroethane sulfonamide ($LiN(SO_2C_2F_5)_2$).

An ionic salt comprising a nitrogenous cation and an anion coordinated thereto may be used as the electrostatic dissipative property enhancer in the form of an organic salt. Examples of the nitrogenous cation include pyridinium, pyridazinium, pyrimidinium, pyrazinium, imidazolium, pyrazolium, thiazolium, oxazolium, triazolium, and so forth, all of which may be used solely or in combination with others. It is preferable to use imidazolium. Examples of the anion weakly coordinated to the nitrogenous cation include inorganic anions, such as $Cl^-$, $Br^-$, $F^-$, $HSO_4^-$, $H_2PO_4^-$, $NO_3^-$, $ClO_4^-$, $BF_4^-$, $PF_6^-$, $SbF_6^-$, $AsF_6^-$, alkanesulfonates, arylsulfonates, and alkarylsulfonates; and fluoroorganic anions, such as perfluoroalkanesulfonates, cyanoperfluoroalkanesulfonylamides, bis(cyano)fluoroalkanesulfonylmethides, bis(perfluoroalkanesulfonyl)imides, bis(perfluoroalkanesulfonyl)methides, and tris(perfluoroalkanesulfonyl)methides, all of which may be used solely or in combination with others. It is preferable to use a fluoroorganic anion. Physical mixing using various types of mixers, such as a screw extruder, or addition during resin polymerization may be used as a method of dispersing the electrostatic dissipative property enhancer in the form of an inorganic or organic salt in the polymer resin.

The polymer resin constituting the back layer of the transparent multilayer sheet according to the present invention is a transparent, but has no electrostatic dissipative property (i.e. non-conductive). Examples of this transparent non-conductive polymer resin include polyethylene terephthalate (PET), glycol modified polyethylene terephthalate (PETG), glycol modified polycyclohexane terephthalate (PCTG), polymethylmethacrylate (PMMA), polycarbonate (PC), transparent acrylonitrile-butadiene-styrene (transparent ABS), and so forth, all of which may be used solely or in combination with others.

The transparent multilayer sheet according to the present invention may be manufactured by various typical methods, and may be exemplarily manufactured by co-extrusion using a main extruder and a co-extruder. The transparent multilayer sheet according to the present invention may take various forms, for example, a form in which the surface layer and the back layer are attached to each other, a form in which the surface layer is attached on either side of the back layer respectively (i.e., a structure of surface layer-back layer (mid-layer)-surface layer), and so forth. The overall thickness of the transparent multilayer sheet according to the present invention may vary according to its uses, but generally ranges from 0.5 to 10 mm, and preferably from 1 to 8 mm. The thickness of the surface layer ranges from 0.05 to 3 mm, preferably 0.1 to 2 mm, and more preferably 0.2 to 1 mm. Also, the thickness of the back layer or mid-layer ranges from 0.05 to 10 mm, preferably 0.1 to 8 mm, and more preferably 1 to 6 mm. With regard to this, when the thicknesses of the surface and back layers are out of the above ranges, there is a fear that it is impossible to improve the transparency and antistatic properties of the sheet at the same time, or the physical properties of the sheet deteriorate. The transparent multilayer sheet according to the present invention may be used as a packing material for electric/electronic parts requiring transparency and sensitive to static electricity and as a panel for a cleanroom of a semiconductor plant.

Hereinafter, the present invention will be described in detail by way of preferred embodiments of the present invention and comparative examples. However, the following examples are, illustrative merely, and the scope of the present invention should not be construed as being limited thereto.

COMPARATIVE EXAMPLE 1

Polymerization of Polyurethane 62.9% by weight of polybutyleneadipate glycol (PBA) having a number average molecular weight of 1000, 31.5% by weight of 4,4-methylenebis(phenylisocyanate) (MDI), and 5.6% by weight of 1,4-butanediol were put into a continuous reaction extruder (Werner & Pfleiderer ZSK 58 biaxial extruder) with a kneading block corresponding to 30% of the overall screw length, and then a thermoplastic polyurethane resin was polymerized at 190 to 220° C. The screw was rotated at 300 rpm during the polymerization, and 150 ppm of dibutyltin dilaurate was used as a catalyst. The polyurethane resin polymerized in the continuous reaction extruder was formed into pellets by using a pelletizer, and the formed pellets were dried at 70° C. for 5 hours by using a dehumidifying dryer (Conair SC60, Inlet air dew point=−50° C.). After the pellets formed in this way was molded into a quadrangular specimen (150 mm×150 mm×2 mm) by using an injection molding machine, the specimen was left under conditions of a temperature of 23±1° C. and a relative humidity of 50±15% for 24 hours and then was subjected to surface resistivity measurement by a resistivity meter according to the ASTM D-257 standard, the result of which is shown below in Table 1.

COMPARATIVE EXAMPLE 2

Polymerization of Polyurethane

A specimen was prepared and then was subjected to surface resistivity measurement in the same manner as described in Comparative Example 1, except that 60.9% by weight of polytetramethylene glycol (PTMG) having a number average molecular weight of 1000, 32.8% by weight of 4,4-methylenebis(phenylisocyanate) (MDI), and 6.3% by weight of 1,4-butanediol were used. The result of the measurement is shown below in Table 1.

PREPARATION EXAMPLE 1

Polymerization of Polyurethane

A specimen was prepared and then was subjected to surface resistivity measurement in the same manner as described in Comparative Example 1, except that 64.3% by weight of polyethylene glycol (PEG) having a number average molecular weight of 1500, 29.4% by weight of 4,4-methylenebis(phenylisocyanate) (MDI), and 6.3% by weight of 1,4-butanediol were used. The result of the measurement is shown below in Table 1.

PREPARATION EXAMPLE 2

Polymerization of Polyurethane

A specimen was prepared and then was subjected to surface resistivity measurement in the same manner as described in Comparative Example 1, except that 64.0% by weight of polyethylene glycol (PEG) having a number average molecular weight of 1500, 25.9% by weight of hexamethylenediisocyanate (HDI), and 10.1% by weight of 1,4-butanediol were used. The result of the measurement is shown below in Table 1.

PREPARATION EXAMPLE 3

Polymerization of Polyurethane

A specimen was prepared and then was subjected to surface resistivity measurement in the same manner as described in Comparative Example 1, except that (A) 64.3% by weight of polyethylene glycol (PEG) having a number average molecular weight of 1500, (B) 29.4% by weight of 44-methylenebis(phenylisocyanate) (MDI), and (C) 6.3% by weight of 1,4-butanediol were used and lithium(bis)perfluoroethanesulfonimide ($LiN(SO_2C_2F_5)_2$) was added in an amount of 2.5 parts by weight, based on 100 parts of a total of the above compounds (A+B+C). The result of the measurement is shown below in Table 1.

PREPARATION EXAMPLE 4

Polymerization of Polyurethane

A specimen was prepared and then was subjected to surface resistivity measurement in the same manner as described in Comparative Example 1, except that (A) 64.0% by weight of polyethylene glycol (PEG) having a number average molecular weight of 1500, (B) 25.9% by weight of hexamethylenediisocyanate (HDI), and (C) 10.1% by weight of 1,4-butanediol were used, and lithium(bis)perfluoromethanesulfonimide ($LiN(SO_2C_2F_5)_2$) was added in an amount of 1.0 part by weight, based on 100 parts of a total of the above compounds (A+B+C). The result of the measurement is shown below in Table 1.

PREPARATION EXAMPLE 5

Polymerization of Polyurethane

A specimen was prepared and then was subjected to surface resistivity measurement in the same manner as described in Comparative Example 1, except that (A) 78.2% by weight of polyethylene glycol (PEG) having a number average molecular weight of 1500, (3) 18.3% by weight of hexamethylenediisocyanate (HDI), and (C) 10.1% by weight of ethylene glycol were used, and an organic salt comprising an imidazolium-based cation and a (bis)perfluoroethanesulfonimide ($N(SO_2C_2F_5)_2$)-based anion was added in an amount of 2.0 parts by weight, based on 100 parts of a total of the above compounds (A+B+C). The result of the measurement is shown below in Table 1.

TABLE 1

| | Com Ex. 1 | Com. Ex. 2 | Pre. Ex. 1 | Pre. Ex. 2 | Pre. Ex. 3 | Pre. Ex. 4 | Pre. Ex. 5 |
|---|---|---|---|---|---|---|---|
| PBA, Mw = 1000 | 62.9 | — | — | — | — | — | — |
| PTMG, Mw = 1000 | — | 60.9 | — | — | — | — | — |
| PEG, Mw + 1500 | — | — | 64.3 | 64.0 | 64.3 | 64.0 | 78.2 |
| MDI | 31.5 | 32.8 | 29.4 | — | 29.4 | — | — |
| HDI | — | — | — | 25.9 | — | 25.9 | 18.3 |
| 1,4-butanediol | 5.6 | 6.3 | 6.3 | 10.1 | 6.3 | 10.1 | — |
| ethylene glycol | — | — | — | — | — | — | 3.5 |
| $LiN(SO_2C_2F_5)_2$ | — | — | — | — | 2.5 | 1.0 | — |
| imidazolium + $N(SO_2C_2F_5)_2$ | — | — | — | — | — | — | 2.0 |
| Surface Resistivity ($\Omega$/sq.) | 3.2 E13 | 1.8 E13 | 2.4 E11 | 6.1 E9 | 5.4 E7 | 2.7 E7 | 7.5 E7 |

From Table 1, it can be noted that the thermoplastic polyurethane resins prepared using polyethylene glycol in Preparation Examples 1 to 5 exhibit lower surface resistivity than that prepared using polybutyleneadipate glycol (Comparative Example 1) or polytetramethylene glycol (Comparative Example 2), and thus are excellent in antistatic properties. In particular, it can be confirmed that the electrical properties of polyurethane are extraordinarily improved when a lithium salt, such as lithium(bis)perfluoroethanesulfonimide, or imidazolium-based organic salt is contained therein.

COMPARATIVE EXAMPLE 3

Manufacture of Sheet Having Tri-Layer Structure

A transparent sheet having a tri-layer structure, in which the thermoplastic polyurethane resin in Comparative Example 1 constituted the surface layer at either side of the sheet and a glycol modified polyethylene terephthalate (PETG) resin constituted the mid-layer, was manufactured using a sheet extruder with a co-extruder. The overall thickness of the transparent tri-layer sheet was about 3 mm, the thickness of the polyurethane resin constituting each surface layer was about 0.3 mm, and the thickness of the glycol modified polyethylene terephthalate resin constituting the mid-layer was about 2.4 mm. Using the sheet manufactured in this way, a quadrangular specimen (50 mm×50 mm×3 mm) was prepared and then was subjected to luminous transmittance measurement by a hazemeter according to the ASTM D-1003 standard. Also, after another quadrangular specimen (150 mm×150 mm×3 mm) was prepared, the specimen was left under conditions of a temperature of 23±1° C. and a relative humidity of 50±15% for 24 hours and then was subjected to surface resistivity measurement by a resistivity meter according to the ASTM D-257 standard. The results of the above measurement are shown below in Table 2.

COMPARATIVE EXAMPLE 4

Manufacture of Sheet Having Tri-Layer Structure

Specimens were prepared and then were subjected to luminous transmittance measurement and surface resistivity measurement in the same manner as described in Comparative Example 3, except that the thermoplastic polyurethane resin in Comparative Example 2 constituted the surface layer, and a glycol modified polyethylene terephthalate resin constituted the mid-layer. The results of the measurement are shown below in Table 2.

EXAMPLE 1

Manufacture of Sheet Having Tri-Layer Structure

Specimens were prepared and then were subjected to luminous transmittance measurement and surface resistivity measurement in the same manner as described in Comparative Example 3, except that the thermoplastic polyurethane resin in Preparation Example 1 constituted the surface layer, and a glycol modified polyethylene terephthalate resin constituted the mid-layer. The results of the measurement are shown below in Table 2.

EXAMPLE 2

Manufacture of Sheet Having Tri-Layer Structure

Specimens were prepared and then were subjected to luminous transmittance measurement and surface resistivity measurement in the same manner as described in Comparative Example 3, except that the thermoplastic polyurethane resin in Preparation Example 2 constituted the surface layer, and a glycol modified polyethylene terephthalate resin constituted the mid-layer. The results of the measurement are shown below in Table 2.

EXAMPLE 3

Manufacture of Sheet Having Tri-Layer Structure

Specimens were prepared and then were subjected to luminous transmittance measurement and surface resistivity measurement in the same manner as described in Comparative Example 3, except that the thermoplastic polyurethane resin in Preparation Example 3 constituted the surface layer, and a glycol modified polyethylene terephthalate resin constituted the mid-layer. The results of the measurement are shown below in Table 2.

EXAMPLE 4

Manufacture of Sheet Having Tri-Layer Structure

Specimens were prepared and then were subjected to luminous transmittance measurement and surface resistivity measurement in the same manner as described in Comparative Example 3, except that the thermoplastic polyurethane resin, in Preparation Example 4 constituted the surface layer, and a glycol modified polyethylene terephthalate resin constituted the mid-layer. The results of the measurement are shown below in Table 2.

EXAMPLE 5

Manufacture of Sheet Having Tri-Layer Structure

Specimens were prepared and then were subjected to luminous transmittance measurement and surface resistivity measurement in the same manner as described in Comparative Example 3, except that the thermoplastic polyurethane resin in Preparation Example 5 constituted the surface layer, and a glycol modified polyethylene terephthalate resin constituted the mid-layer. The results of the measurement are shown below in Table 2.

EXAMPLE 6

Manufacture of Sheet Having Tri-Layer Structure

Specimens were prepared and then were subjected to luminous transmittance measurement and surface resistivity measurement in the same manner as described in Comparative Example 3, except that the thermoplastic polyurethane resin in Preparation Example 3 constituted the surface layer, and a glycol modified polycyclohexane terephthalate (PCTG) resin constituted the mid-layer. The results of the measurement are shown below in Table 2.

EXAMPLE 7

Manufacture of Sheet Having Tri-Layer Structure

Specimens were prepared and then were subjected to luminous transmittance measurement and surface resistivity measurement in the same manner as described in Comparative Example 3, except that the thermoplastic polyurethane resin in Preparation Example 3 constituted the surface layer, and a polymethylmethacrylate (PMMA) resin constituted the mid-layer. The results of the measurement are shown below in Table 2.

TABLE 2

| | surface layer | mid-layer | luminous transmittance | surface resistivity ($\Omega$/sq.) |
|---|---|---|---|---|
| Com. Ex. 3 | polyurethane in Com. Ex. 1 | PETG | 83 | 3.8 E13 |
| Com. Ex. 4 | polyurethane in Com. Ex. 2 | PETG | 83 | 1.5 E13 |
| Ex. 1 | polyurethane in Pre. Ex. 1 | PETG | 87 | 3.5 E11 |
| Ex. 2 | polyurethane in Pre. Ex. 2 | PETG | 84 | 8.3 E9 |
| Ex. 3 | polyurethane in Pre. Ex. 3 | PETG | 87 | 4.2 E7 |
| Ex. 4 | polyurethane in Pre. Ex. 4 | PETG | 84 | 3.1 E7 |
| Ex. 5 | polyurethane in Pre. Ex. 5 | PETG | 85 | 8.3 E7 |
| Ex. 6 | polyurethane in Pre. Ex. 3 | PCTG | 90 | 5.3 E7 |
| Ex. 7 | polyurethane in Pre. Ex. 3 | PMMA | 91 | 3.9 E7 |

As shown in Table 2, a multilayer (tri-layer) sheet having the surface layer made of urethane and the mid-layer made of a transparent polymer resin is excellent in transparency. In particular, when a thermoplastic polyurethane resin prepared using polyethylene glycol is used as the surface layer (in the case of Example 1 to 7), the sheet has low surface resistivity, and thus superior electrostatic dissipative properties. Also, when the sheet contains a lithium salt, such as lithium(bis) perfluoroethanesulfonimide, or imidazolium-based organic salt, its electrical properties are extraordinarily improved.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A transparent multilayer sheet having electrostatic dissipative properties, the sheet comprising:
a surface layer comprising a conductive thermoplastic polyurethane or polyurea resin wherein the polyurethane or polyurea resin comprises a polymerization reaction product of (a) polyethylene glycol; (b) an aromatic or aliphatic diisocyanate compound; and (c) a chain extender C2 to C10 containing a primary hydroxyl group or an amine group; and
a back layer attached to the surface layer where said back layer consists of a transparent non-conductive polymer layer wherein said layer comprises a transparent non-conductive polymer resin;
wherein the transparent multilayer sheet further comprises an electrostatic dissipative property enhancer in the form of an inorganic or organic salt in an amount of 0.1 to 20 parts by weight, based on 100 parts by weight of a total use amount of the polyethylene glycol, the diisocyanate compound, and the chain extender; and
wherein the electrostatic dissipative property enhancer in the form of an organic salt comprises a nitrogenous cation and an anion coordinated thereto, the nitrogenous cation is selected from the group consisting of pyridinium, pyridazinium, pyrimidinium, pyrazinium, imidazolium, pyrazolium, thiazolium, oxazolium, triazolium, and mixtures thereof, and the anion is selected from the group consisting of $Cl^-$, $Br^-$, $F^-$, $HSO_4^-$, $H_2PO_4^-$, $NO_3^-$, $ClO_4^-$, $BF_4^-$, $PF_6^-$, $SbF_6^-$, $AsF_6^-$, alkanesulfonates, arylsulfonates, and alkarylsulfonates, perfluoroalkanesulfonates, cyanoperfluoroalkanesulfonylamides, bis(cyano)fluoroalkanesulfonylmethides, bid(perfluoroalkanesulfonyl)imides, bis(perfluoroalkanesulfonyl)methides, tris(perfluoroalkanesulfonyl) methides, and mixtures thereof.

2. The transparent multilayer sheet as claimed in claim 1, wherein the polyethylene glycol has a number average molecular weight (Mn) of 500 to 10,000.

3. The transparent multilayer sheet as claimed in claim 1, wherein the diisocyanate compound is selected from the group consisting of 1,6-hexamethylene diisocyanate (HDI), 4,4-dicyclohexylmethane diisocyanate, 3-isocyanato methyl-3,5,5-trimethyl cyclohexyl isocyanate, 1,4-cyclohexyl diisocyanate, 2,2,4-trimethylhexamethylene diisocyanate, 1,4-phenylene diisocyanate, 2,4-toluene diisocyanate, 2,6-toluene diisocyanate, 2,2'-methylene diphenyl diisocynate, 2,4'-methylene diphenyl diisocynate, 4,4'-methylene diphenyl diisocynate, naphthalene diisocynate, and mixtures thereof.

4. The transparent multilayer sheet as claimed in claim 1, wherein the chain extender is selected from the group consisting of ethylene glycol, diethylene glycol, propylene glycol, dipropylene glycol, 1,3-propanediol, 1,4-butanediol, 1,5-pentanediol, 1,10-decanediol, 2,2-dimethyl-1,3-propanediol, 1,4-cyclohexane dimethanol, hydroquinone bis(2-hydroxyethyl) ether, 1,6-hexanediol, and neopenthyl glycol, 1,2-propylenediamine, 1,3-propylenediamine, isophoronediamine, ethylenediamine, N-methylpropylene-1,3-diamine, N,N'-dimethylenediamine, and mixtures thereof.

5. The transparent multilayer sheet as claimed in claim 1, wherein the diisocyanate compound is used in an amount of 0.90 mol to 1.10 mol, based on 1.0 mol of a total of the chain extender and the polyethylene glycol.

6. The transparent multilayer sheet as claimed in claim 1, wherein the chain extender is used in an amount of 0.1 mol to 30 mol, based on 1 mol of the polyethylene glycol.

7. The transparent multilayer sheet of claim 1, wherein the electrostatic dissipative property enhancer in the form of an inorganic salt further comprises lithium perchlorate, lithium hexafluorophosphate, lithium hexafluoroarsenate, lithium iodine, lithium bromide, lithium thiocyanate, lithium nitrate, lithium sulfide, lithium tris(trifluoromethylsufonyl) methide, trifluoromethanesulfonic acid lithium salt, lithium(bis)trifluoromethane sulfonimide, lithium(bis)perfluoroethane sulfonamide), 5-lithiosulfo isophthalic acid, 3,5-diiodo-2-hydroxybenzoic acid lithium salt, 3,5-diiodosalicyclic acid lithium salt, beta-hydroxypyruvic acid lithium salt hydrate, carbamoylphosphate dilithuim salt, p- toluenesulfinic acid lithium salt, poly(ethylene-co-methacrylic acid) lithium salt, toluene-4-sulfinic acid lithium salt anhydrous, and mixtures thereof.

8. The transparent multilayer sheet as claimed in claim 1, wherein the transparent non-conductive polymer resin is selected from the group consisting of polyethylene terephthalate, glycol modified polyethylene terephthalate, glycol modified polycyclohexane terephthalate, polymethylmethacrylate, polycarbonate, transparent acrylonitrile-butadiene-styrene (transparent ABS), and mixtures thereof.

9. The transparent multilayer sheet as claimed in claim 1, wherein the surface layer has a thickness of 0.05 to 3 mm, and the back layer has a thickness of 0.05 to 10 mm.

10. The transparent multilayer sheet as claimed in claim 1, which has a form in which the surface layer is attached on either side of the back layer respectively.

11. A transparent multilayer sheet having electrostatic dissipative properties, the sheet comprising:
a surface layer comprising a conductive thermoplastic polyurethane or polyurea resin wherein the polyurethane or polyurea resin comprises a polymerization reaction product of (a) polyethylene glycol; (b) an aromatic or aliphatic diisocyanate compound;
and (c) a chain extender C2 to C10 containing a primary hydroxyl group or an amine group; and
a back layer attached to the surface layer and comprising a transparent non-conductive polymer resin;
wherein the transparent multilayer sheet further comprises an electrostatic dissipative property enhancer in the form of an inorganic or organic salt in an amount of 0.1 to 20 parts by weight, based on 100 parts by weight of a total use amount of the polyethylene glycol, the diisocyanate compound, and the chain extender; and
wherein the electrostatic dissipative property enhancer in the form of an organic salt comprises a nitrogenous cation and an anion coordinated thereto, the nitrogenous cation is selected from the group consisting of pyridinium, pyridazinium, pyrimidinium, pyrazinium, imidazolium, pyrazolium, thiazolium, oxazolium, triazolium, and mixtures thereof, and the anion is selected from the group consisting of $Cl^-$, $Br^-$, $F^-$, $HSO_4^-$, $H_2PO_4^-$, $NO_3^-$, $ClO_4^-$, $BF_4^-$, $PF_6^-$, $SbF_6^-$, $AsF_6^-$, alkanesulfonates, arylsulfonates, and alkarylsulfonates, perfluoroalkanesulfonates, cyanoperfluoroalkanesulfonylamides, bis(cyano)fluoroalkanesulfonylmethides, bid(perfluoroalkanesulfonyl)imides, bis(perfluoroalkanesulfonyl)methides, tris(perfluoroalkanesulfonyl) methides, and mixtures thereof.

12. A transparent multilayer sheet having electrostatic dissipative properties, the sheet comprising:
a surface layer comprising a conductive thermoplastic polyurethane or polyurea resin wherein the polyurethane or polyurea resin comprises a polymerization reaction product of (a) polyethylene glycol; (b) an aromatic or aliphatic diisocyanate compound;

and (c) a chain extender C2 to C10 containing a primary hydroxyl group or an amine group; and a back layer attached to the surface layer and comprising a transparent non-conductive polymer resin;

wherein the transparent multilayer sheet further comprises an electrostatic dissipative property enhancer in the form of an inorganic or organic salt in an amount of 0.1 to 20 parts by weight, based on 100 parts by weight of a total use amount of the polyethylene glycol, the diisocyanate compound, and the chain extender; and wherein the electrostatic dissipative property enhancer in the form of an organic salt comprises a nitrogenous cation and an anion coordinated thereto.

* * * * *